United States Patent
Anderson, III

(10) Patent No.: US 6,714,761 B1
(45) Date of Patent: Mar. 30, 2004

(54) METEOR BURST COMMUNICATION SYSTEM HAVING THE CAPABILITY OF SIMULTANEOUS COMMUNICATION WITH MULTIPLE REMOTE UNITS

(75) Inventor: Fred L. Anderson, III, East Buckley, WA (US)

(73) Assignee: StarCom Wireless, Inc., Bellingham, WA (US)

( * ) Notice: Subject to any disclaimer, the term of this patent is extended or adjusted under 35 U.S.C. 154(b) by 294 days.

(21) Appl. No.: 09/718,433

(22) Filed: Nov. 21, 2000

(51) Int. Cl.[7] .............................. H04B 3/36; H04M 1/00
(52) U.S. Cl. ......................... 455/7; 455/505; 455/561; 455/67.11
(58) Field of Search ................................ 455/67.4, 67.1, 455/69, 562, 561, 15, 16, 500, 517, 505, 64, 67.11–67.16, 562.1, 7, 39, 40, 66.1, 9, 10, 11.1, 14

(56) References Cited

U.S. PATENT DOCUMENTS

| 4,277,845 A | * | 7/1981 | Smith et al. ................. 455/505 |
| 4,630,314 A | | 12/1986 | Smith |
| 4,642,806 A | | 2/1987 | Hewitt et al. |
| 4,685,149 A | | 8/1987 | Smith et al. |
| 4,845,504 A | | 7/1989 | Roberts et al. |
| 4,939,731 A | | 7/1990 | Reed et al. |
| 4,985,707 A | | 1/1991 | Schmidt et al. |
| 5,119,500 A | * | 6/1992 | Bickel ........................ 455/15 |
| 5,127,051 A | | 6/1992 | Chan et al. |
| 5,134,715 A | | 7/1992 | Parl et al. |
| 5,278,568 A | * | 1/1994 | Enge et al. ................. 455/517 |
| 5,285,478 A | | 2/1994 | Wornell et al. |
| 5,392,223 A | | 2/1995 | Caci |
| 5,432,841 A | | 7/1995 | Rimer |
| 5,448,230 A | | 9/1995 | Schanker et al. |
| 5,541,955 A | | 7/1996 | Jacobsmeyer |
| 5,557,644 A | | 9/1996 | Kuwabara |
| 5,737,330 A | * | 4/1998 | Fulthorp et al. ............ 455/517 |
| 6,097,703 A | | 8/2000 | Larsen et al. |

* cited by examiner

*Primary Examiner*—Sinh Tran
*Assistant Examiner*—Eliseo Ramos-Feliciano
(74) *Attorney, Agent, or Firm*—Christensen O'Connor Johnson Kindness PLLC

(57) ABSTRACT

A meteor burst communication system (10) has the capability of simultaneously communicating with multiple remote units (14). The meteor burst system includes a base station (12) having a processing unit, or main processor (16), that generates a probe signal (76). A transmitter (54, 56, 58) transmits the probe signal to the remote units. The remote units receive the probe signal and respond to the probe signal by transmitting data signals (78, 80, 82) to the base station. The base station includes a plurality of receivers (38, 40, 42, 44) that receive the data signals from the remote units. A plurality of receiver processors (46, 48, 50, 52) process the data signals received from the remote units. When the data signals have been received from the remote units, the main processor formulates an acknowledgment signal (84), and the acknowledgment signal is transmitted to the remote units.

24 Claims, 3 Drawing Sheets

METEOR BURST COMMUNICATION SYSTEM HAVING THE CAPABILITY OF SIMULTANEOUS COMMUNICATION WITH MULTIPLE REMOTE UNITS

FIELD OF THE INVENTION

The present invention relates to meteor burst communication systems, and more particularly to a meteor burst communication system having the capability of simultaneous communication with multiple remote units.

BACKGROUND OF THE INVENTION

Meteor burst communication systems are becoming well known for providing communication of low data rate packets of digital data between a base station and one or more remote units over long distances, such as up to 1,000 miles or more.

In a typical meteor burst communication system, a base station transmits digital probe signals to one or more remote units. A remote unit receiving a probe signal responds by transmitting a digital data signal to the base station. The signals are reflected from ionization trails left by meteors that are traveling through the Earth's upper atmosphere at an altitude of about 50 to 70 miles above the Earth's surface. The meteor trails result from the ionization of air particles through which the meteor travels and exist for only a short time interval, such as from a few milliseconds to a few seconds. Therefore, a signal burst transmission mode is typically used for transmitting the probe signals and data signals. The durations of the signal bursts are selected such that the overall time for their transmission does not exceed the time of duration of a typical meteor ionization trail. Thus, the signal bursts typically range from tens of milliseconds to hundreds of milliseconds.

Meteor burst communication systems are well suited for communicating between stationary transceivers. For example, the meteor burst communication system of U.S. Pat. No. 4,277,845 discloses fixed remote units that transmit weather data from relatively inaccessible regions, where the remote units are located, to a fixed base station.

Meteor burst communication systems are also well suited for communicating between a stationary base station and mobile remote units. For example, a mobile radio communication network uses meteor burst communications to communicate vehicle position data to a base station from remote units that are mounted on the vehicles. Such a system is disclosed in U.S. Pat. No. 4,845,504.

As the number of remote units increases, the geographic area between remote units decreases correspondingly. This results in an increased probability that more than one remote unit will acknowledge a probe signal at about the same time. This can result in a collision between simultaneous transmissions of two remote units.

The prior art dealt with the problem of collisions between simultaneous transmissions by simply avoiding collisions. For example, in U.S. Pat. No. 4,845,504, an attempt is made to avoid collisions between simultaneous transmissions of two mobile stations through the use of a selective antenna receive pattern at the base station. However, in the event that two simultaneous mobile transmissions are received in a same receive sector, the base station will not acknowledge any message containing errors as a result of the collision between simultaneous transmissions.

Therefore, in the prior art, base stations communicate with remote units one at a time in a time-sequential manner. This is an inefficient use of the communication capabilities of a meteor burst communication system and limits the number of remote units that can be serviced by a base station. Therefore, there is an unmet need in the art for a meteor burst communication system having a capability of simultaneously communicating with multiple remote units.

SUMMARY OF THE INVENTION

The present invention provides a meteor burst communication system that includes a base station capable of simultaneously communicating with multiple remote units via meteor ionization trails. The base station includes a main processor that generates a probe signal. A transmitter transmits the probe signal throughout a geographic area that includes the remote units. The remote units receive the probe signal and respond by transmitting data signals to the base station. The base station includes a plurality of receivers that receive the data signals from the remote units via the meteor ionization trails. A plurality of receiver processors process the data signals received from the remote units. When all the received data signals have been processed by the plurality of receiver processors, the main processor formulates an acknowledgment signal, and the acknowledgment signal is transmitted throughout the geographic area that includes the remote units.

According to one aspect of the present invention, each receiver is coupled to provide its demodulated output signal to an associated receiver processor. Each receiver processor is coupled to supply its output signal to a main processor. Signals from multiple remote units can be received by the receivers, and each separate receiver processor can process the signals received from the remote units at the same time. Therefore, according to the present invention, the processing capability of the meteor burst base station is increased beyond conventional meteor burst base stations and the base station can communicate with more remote units than can conventional meteor burst base stations.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
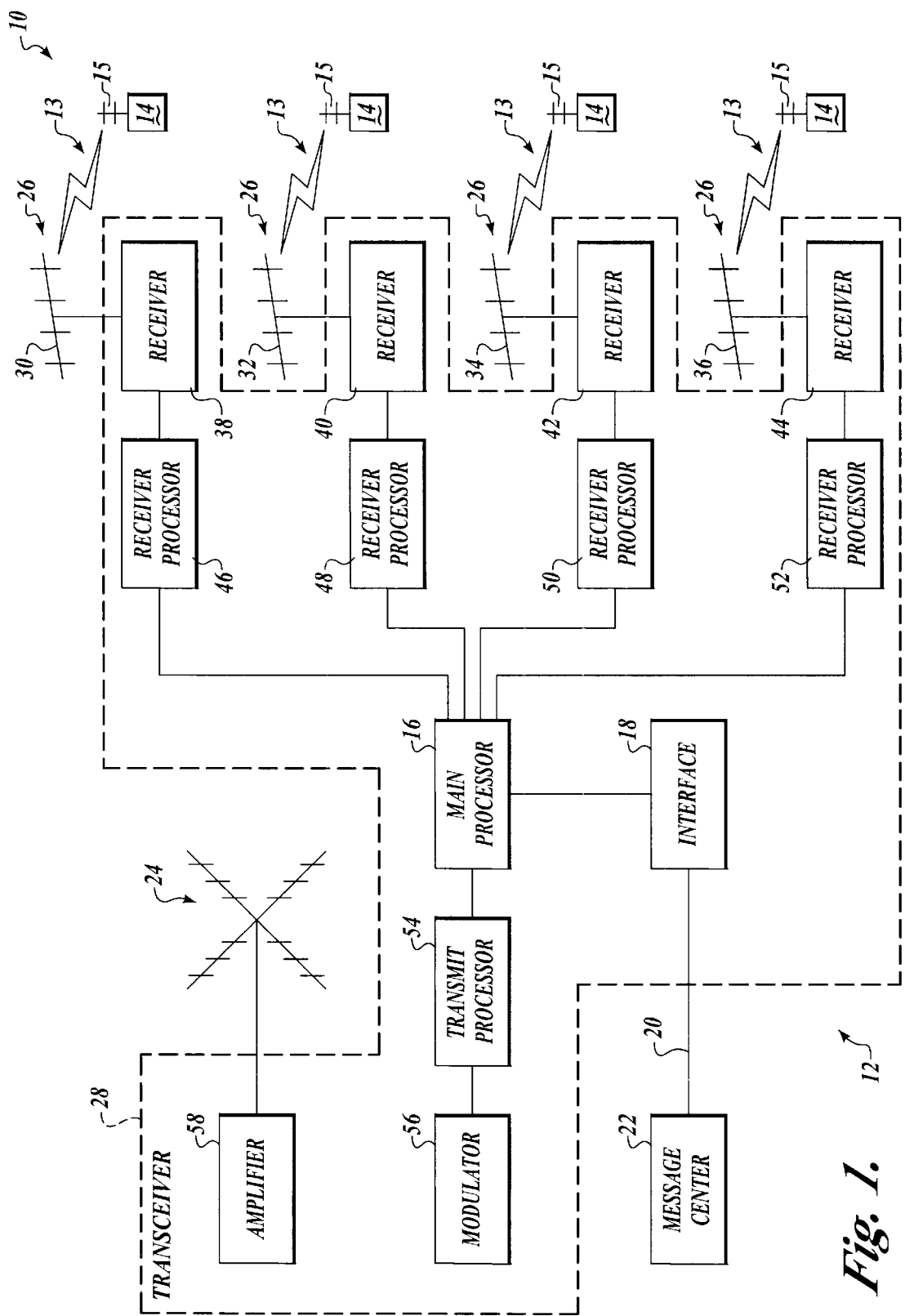
FIG. 1 is a block diagram of a meteor burst communication system according to the present invention.

FIG. 1 shows a block diagram of a meteor burst communication system 10 according to the present invention. The system 10 includes a base station 12 and a plurality of remote units 14, each of which has a unique communication address for identification. According to the present invention, the base station 12 can communicate simultaneously with more than one remote unit 14 via reflection from meteor ionization trails 13 by using multiple receivers and processors to receive and process data signals sent from multiple remote units 14, as described in more detail below.

Each remote unit 14 is a very high frequency (VHF) transceiver. Each remote unit 14 suitably operates in a frequency range of between about 20–100 MHz and preferably between about 35–60 MHz, as is known in the art. Each remote unit 14 includes a suitable antenna 15 for transmitting and receiving radio frequency (RF) data signals to and from the base unit 12 via the meteor ionization trail 13. The RF data signals are packets of data, such as a unique identifier for each remote unit 14 or data collected by sensors such as position data or any other desired data. The data signals suitably encode a digitized packet of information, such as position information indicative of the location of the remote unit 14. For example, the position information may be obtained from a global positioning system (GPS) and provided to the remote unit 14 for transmission. Each data packet preferably has a same packet length, although data packets suitably have different lengths, as well. The remote unit 14 transmits the data signal in response to receipt of a probe signal from the base station 12. Alternatively, the remote unit 14 transmits the data signal on a predetermined, periodic basis. Periodic transmissions from the remote unit 14 may be made either in lieu of response to a probe signal or in addition to response to a probe signal. VHF transceivers, as used in the remote units 14, are well known to those of ordinary skill in the art.

The base station 12 includes a main processor 16. The main processor 16 is a processing unit that generates digital signals for transmission to the remote units 14, such as probe signals requesting remote units 14 receiving the probe signal to respond. The main processor 16 also generates acknowledgment signals that acknowledge receipt of digital signals from the remote units 14. The main processor 16 is electrically connected to a communications interface 18 that suitably includes, for example, an RS 232 driver/receiver and a universal asynchronous receiver/transmitter (UART). The communication interface 18 is in data communication via a communication link 20 to a message center 22. The communication link 20 is suitably a telecommunications land line or a cellular phone link. The message center 22 may be, for example, a central dispatching office that tracks and reports position information of vehicles, such as trucks, cars, ships, trains, or any desired vehicles or vessels in which the remote units 14 are located. Alternatively, the message center 22 may be a processing center that generates billing statements for fleets of vehicles or vessels.

The base station 12 also includes a transmit antenna system 24, a receiver antenna system 26, and a transceiver 28. The transmit antenna system 24 includes any suitable antenna or array of antennas for transmitting RF signals throughout the geographic area covered by the plurality of remote units 14. The transmit antenna system 24 suitably includes any type of antenna, and preferably includes a yagi antenna, such as a two-element yagi antenna or a three-element yagi antenna. The transmit antenna system 24 also suitably includes an array of dipole antennas.

The receiver antenna system 26 includes an array of antennas 30, 32, 34, and 36 for receiving RF signals from the remote units. The composite area covered by the receiver antenna system 26 extends throughout the geographic area covered by the plurality of remote units and coincides with the coverage of the transmit antenna system 24. Each antenna 30, 32, 34, and 36 receives RF signals from one or more of the remote units 14 within the coverage area of the antenna. In a presently preferred embodiment, each antenna 30, 32, 34, and 36 provides 90° of azimuthal coverage. Each antenna 30, 32, 34, and 36 suitably includes an array of pencil-beam antennas that are capable of receiving a narrow beam. Each antenna 30, 32, 34, and 36 is suitably a rhombic antenna, or is suitably an array of yagi antennas such as six- or eight-element yagi antennas. It will also be appreciated that a phased-array system, with acceptable beam-forming circuitry for forming multiple narrow beams, may also be used for the receiver antenna system 26.

The transceiver 28 includes receivers 38, 40, 42, and 44. Each of the receivers 38, 40, 42, and 44 is connected to receive input signals from the antennas 30, 32, 34, and 36, respectively. The receivers 38, 40, 42, and 44 are VHF receivers that suitably operate within a frequency band from about 20–100 MHz and preferably from about 35–60 MHz, as is known. The receivers 38, 40, 42, and 44 are suitably noncoherent, and are preferably coherent in order to increase gain over noncoherent embodiments. The receivers 38, 40, 42, and 44 suitably demodulate phase shift keying (PSK) modulation, minimum shift keying (MSK) modulation, or Gaussian minimum shift keying (GMSK) modulation. Each receiver 38, 40, 42, and 44 provides a demodulated output signal that corresponds to received signals from remote units 14 within the geographic coverage area of the respective antennas 30, 32, 34, and 36. Because VHF receivers are well-known in the art, details of the construction and operation of the receivers 38, 40, 42, and 44 are not necessary for an understanding of the invention.

Receiver processors 46, 48, 50, and 52 each have an input terminal that is coupled to receive the demodulated output signals from the receivers 38, 40, 42, and 44, respectively. Thus, the receiver processors 46, 48, 50, and 52 each separately process data that corresponds to signals sent by remote units 14 within the azimuthal coverage area of the antennas 30, 32, 34, and 36, respectively. Each receiver processor receives data from its associated receiver and validates the received data. For example, checksum comparison is suitably used to validate data. The receiver processors 46, 48, 50, and 52 monitor the receivers 38, 40, 42, and 44, respectively, to ensure each receiver is operating properly. The receiver processors 46, 48, 50, and 52 are suitably any acceptable processor known in the art, such as an 8-bit, 80C188 processor. In a presently preferred embodiment of the invention, the receiver processors 46, 48, 50, and 52 are separate from the main processor 16. However, it will be appreciated that the main processor 16 may suitably integrate the receiver processors 46, 48, 50, and 52.

While four antennas 30, 32, 34, and 36, four receivers 38, 40, 42, and 44, and four receiver processors 46, 48, 50, and 52 have been shown by way of nonlimiting example, it will be appreciated that any number of antennas, receivers, and receiver processors may be used in accordance with the present invention for a particular application. For example, the number of antennas, receivers, and receiver processors in the base station may vary in relationship to the number of remote units in the system, their geographical proximity, and/or the expectation that the remote units will concurrently transmit data signals to the base station. Using an increased number of antennas, receivers, and receiver processors in accordance with the invention to cover an increased number of smaller sectors reduces the possibility that two or more remote units attempting to simultaneously communicate with the base station will be in the same sector, thus reducing collisions as experienced in the prior art. Where two or more remote units in a single sector do concurrently transmit data signals to the base station, the random distribution of the remote units, different transmission path lengths, and the relatively low transmission signal levels generally result in the base station receiver locking on to the first signal received and receive. data from that remote unit (to the exclusion of the other concurrently-transmitting remote unit(s) in the sector).

In FIG. 1, the main processor 16 is electrically connected to the receiver processors 46, 48, 50, and 52 receives output signals from each of the receiver processors 46, 48, 50, and 52. As discussed above, the main processor 16 formulates the probe signal that is transmitted to the remote units 14. When the main processor 16 does not receive an input signal within a predetermined time period from any of the receiver processors 46, 48, 50, or 52, indicating that at least one of the remote units 14 has responded to the probe signal, the main processor 16 may generate another probe signal. A suitable predetermined time period is on the order of about 50 to 500 milliseconds. An optimum time period may be determined based on data rate, average and maximum transmission path lengths, and other relevant data communication parameters.

The main processor 16 receives the digital signals from the receiver processors 46, 48, 50, and 52, and processes the information contained within the digital data signals. The main processor 16 performs a suitable error correction routine on the received digital signals, such as any known forward error correction (FEC) algorithm. The main processor 16 analyzes the digital data signals, formulates a summary message containing the information from all the received data signals, and communicates the summary message to the message center 22 via the interface 18 and the communications link 20. The main processor 16 generates an acknowledgment signal for transmission throughout the geographic area that includes the remote units 14. The acknowledgment signal that the main processor 16 formulates in response to the receipt of at least one signal from at least one of the remote units 14 includes data identifying the remote unit 14 that sent the signal, such as the unique address or a portion of the unique address of the remote unit 14. Transmission of the acknowledgment signal is suitably accomplished in a single transmission, such as transmitting one packet that is sufficiently large to include an acknowledgment to each of the unique identifiers corresponding to remote units 14 from which data was successfully received by the base station 12. Alternatively, the acknowledgment signal may suitably include several packets in succession, the separate packets including the unique identifier of a remote unit 14 from which a data signal was successfully received by the base station 12.

The main processor 16 also generates transmit instructions for controlling which of the remote units 14 are acknowledged. When the acknowledgment signal includes several separate packets in succession, the main processor 16 generates instructions that determine the order in which the separate acknowledgment packets are assembled. The main processor 16 may be any acceptable processor known in the art, such as an 80C486 processor or a Pentium™ processor, available from the Intel Corporation of Santa Clara, Calif.

A transmit processor 54 is electrically connected to the main processor 16 and receives a message that is to be transmitted. For example, the transmit processor 54 receives the probe signal or the acknowledgment signal from the main processor 16 and formats the signal for transmission to the geographic area including the remote units 14. The transmit processor 54 also receives the transmit instructions from the main processor 16. In response to the transmit instructions, the transmit processor 54 assembles a signal for transmission. The signal is assembled such that the signal will be transmitted throughout the geographic area that includes remote units 14. For example, the transmit processor 54 may assemble for transmission one packet that includes the unique identifiers of all the remote units 14 to be acknowledged. The transmit processor 54 assembles the unique identifiers in an order specified in the transmit instructions. Alternatively, the transmit processor 54 may assemble a stream of separate packets that are all to be transmitted throughout the geographic area that includes all the remote units 14. The transmit processor 54 places the separate packets in an order specified in the transmit instructions. In a presently preferred embodiment, the transmit processor 54 is separate from the main processor 16. However, it will be appreciated that, in an alternative embodiment, the transmit processor 54 may be integrated within the main processor 16. The transmit processor 54 is suitably any acceptable processor, such as an 8-bit, 80C188 processor.

A modulator 56 is coupled to receive the formatted message from the transmit processor 54. The modulator 56 is suitably a VHF modulator suitably operating in a range of 20–100 MHz or preferably 35–60 MHz, as is known. The modulator uses any suitable modulation scheme, such as PSK, MSK, and preferably GMSK modulation. The modulator 56 is suitably a noncoherent modulator, and is preferably a coherent-compatible modulator to increase gain.

An amplifier 58 receives the modulated data for transmission from the modulator 56 and amplifies the RF signal for transmission. The amplifier 58 has an amplification power as desired for a particular application, and in one exemplary embodiment given by way of nonlimiting example, the amplifier 58 is suitably a 5 kW amplifier. The amplifier 58 may be comprised of an amplifier that is known in the art. The amplified RF signal from the amplifier 58 is input to the transmit antenna system 24. As discussed above, the transmit antenna system 24 transmits the RF signal throughout the geographic area covered by the remote meteor burst units 14.

Figure 2:
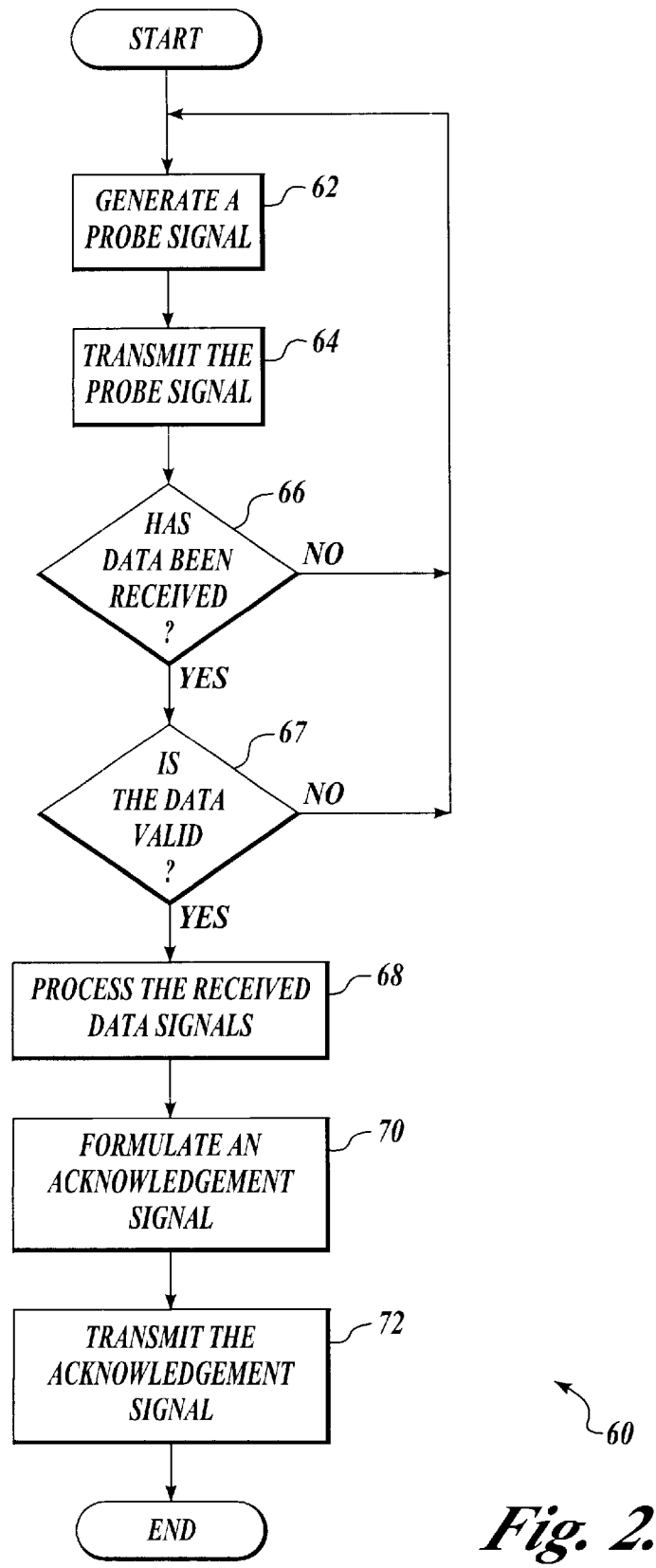
FIG. 2 is a flowchart of a method according to the present invention.
Figure 3:
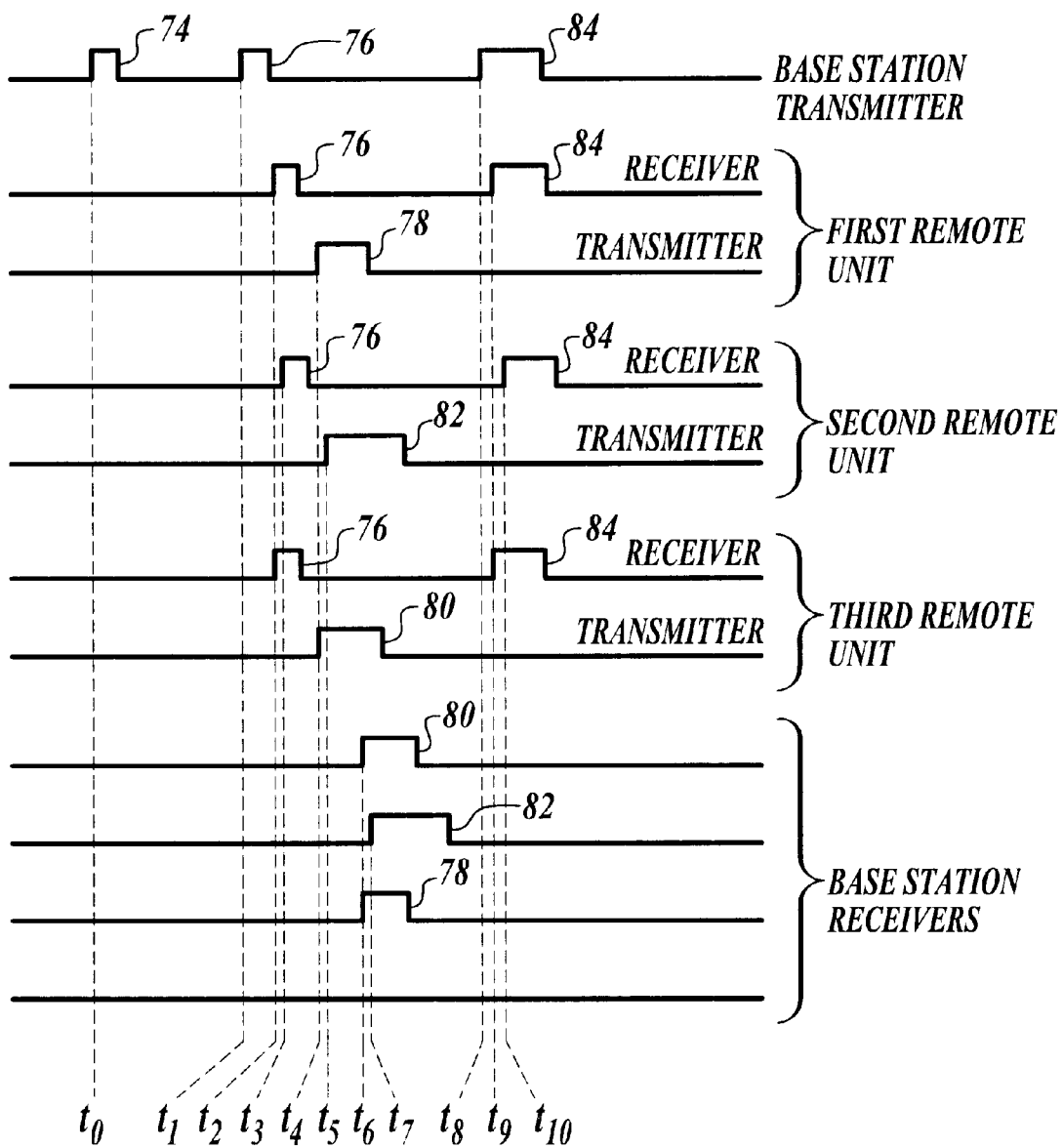
FIG. 3 shows an example of timing signals used in the present invention.

Operation of the meteor burst communication system 10 will now be explained by reference to a flow chart, shown in FIG. 2, and a timing diagram of exemplary signals generated by the system 10, as shown in FIG. 3. Referring now to FIG. 2, a flowchart of a method 60 according to the present invention is shown. At a block 62, a probe signal is formulated at the base station 12, and at a block 64, the probe signal is transmitted by the base station 12 to one or more of the remote units 14, as described above. At a decision block 66, a determination is made whether data has been received within a predetermined time period from any of the remote units 14 in response to the probe signal. When data is not received within the predetermined time period, the method 60 returns to the block 62.

When data is received within the predetermined time period, at a decision block 67 a determination is made whether the received data is valid. In an embodiment where the remote unit 14 transmits data on a periodic basis and not in response to receipt of a probe signal, the method 60 suitably begins at the decision block 67. As discussed above, a checksum comparison is suitably made to determine validity of the received data. If the received data is not valid, the method 60 returns to block 62. If the received data is valid, at a block 68, the received, valid data is processed by the base station 12 as described earlier.

At a block 70, the base station 12 formulates an acknowledgment signal to acknowledge that the data was successfully received. At a block 72, the acknowledgment signal is transmitted to the geographic area including the remote units 14. If any one of the remote units 14 has received another probe signal other than the probe signal generated at the block 62, the remote unit 14 that received the other probe signal begins to transmit its next packet data signal after the remote unit 14 receives the acknowledgment signal transmitted at the block 72.

FIG. 3 shows a nonlimiting timing diagram of exemplary signals generated by the meteor burst communication system 10 while performing the method 60. The timing diagram of FIG. 3 demonstrates how the base station 12 simultaneously communicates with three remote units 14 that transmit data to the base station 12 from different directions. At a time to, a probe signal 74 is formulated and transmitted. Because no data is received within the predetermined time period in response to the probe signal 74 transmitted at the time to, a second probe signal 76 is formulated and transmitted at a time $t_1$. In the nonlimiting example of FIG. 3, the probe signal 76 is received by a first remote unit 14, a second remote unit 14, and a third remote unit 14. Specifically, at a time $t_2$, the probe signal 76 is received at the first and third remote units 14. At a time $t_3$, the probe signal 76 is received at the second remote unit 14. At a time $t_4$, the first and third remote units 14 begin transmitting their data signals 78 and 80, respectively. At a time $t_5$, the second remote unit 14 begins transmitting its data signal 82. At time $t_6$, the receiver 38 begins receiving the data signal 80 from the third remote unit 14, and the receiver 42 simultaneously begins receiving the data signal 78 from the first remote unit 14. At a time $t_7$, the receiver 40 begins receiving the data signal 82 from the second remote unit 14. In this nonlimiting example, no signal is received by the receiver 44 or by any additional receivers (not shown) that are suitably included in the base station 12.

At a time $t_8$, after the received data signals 78, 80, and 82 have been processed, an acknowledgment signal 84 is formulated and transmitted throughout the geographic area that includes the remote units 14. As described above, the acknowledgment signal 84 may be one packet that includes an acknowledgment addressed to the unique identifiers of the first, second, and third remote units 14, or the acknowledgment signal 84 may include separate packets individually addressed to the first, second, and third remote units 14. At a time $t_9$, the first and third remote units 14 receive the acknowledgment signal 84. At a time $t_{10}$, the second remote unit 14 receives the acknowledgment signal 84.

Thus, according to the present invention, signals can be simultaneously received from one or more of the remote units 14 and can be separately processed by the receivers 38, 40, 42, and 44, and respective receiver processors 46, 48, 50, and 52. Therefore, more than one remote unit 14 may be acknowledged simultaneously rather than one remote unit 14 being acknowledged at a time.

While embodiments of the invention have been illustrated and described herein, it will be appreciated that various changes can be made therein without departing from the spirit and scope of the invention. The scope of the invention should therefore be determined based on the following claims and equivalents thereto.

The embodiments of the invention in which an exclusive property or privilege is claimed are defined as follows:

1. A method of simultaneous communication with at least first and second remote meteor burst units, the method comprising:

simultaneously transmitting first and second data signals from the first and second remote meteor burst units, respectively, to a meteor burst base station;

receiving and demodulating the first data signal from the first remote meteor burst unit with a first receiver in the meteor burst base station to produce a first demodulated data signal;

receiving and demodulating the second data signal from the second remote meteor burst unit with a second receiver in the meteor burst base station, simultaneously with the receiving and demodulating by the first receiver, to produce a second demodulated data signal;

receiving and processing the content of the first demodulated data signal from the first receiver with a first receiver processor dedicated to the first receiver;

receiving and processing the content of the second demodulated data signal from the second receiver with a second receiver processor dedicated to the second receiver, simultaneous with the receiving and processing by the first receiver processor;

formulating an acknowledgment signal after the first and second receiver processors have respectively processed the content of the first and second demodulated data signals; and transmitting the acknowledgment signal simultaneously to the first and second remote meteor burst units.

2. The method of claim 1, further comprising:

formulating a probe signal;

simultaneously transmitting the probe signal from the meteor burst base station to the first and second remote meteor burst units; and receiving the probe signal at the first and second remote meteor burst units.

3. The method of claim 2, wherein the first and second remote meteor burst units transmit the first and second data signals, respectively, in response to receipt of the probe signal.

4. The method of claim 3, further comprising generating another probe signal when the first and second data signals are not received within a predetermined time period after the probe signal is transmitted.

5. The method of claim 1, wherein processing the content of the first and second demodulated data signals with the first and second receiver processors, respectively, comprises validating data in the demodulated data signals.

6. The method of claim 5, further comprising generating a probe signal when the data received from the first and second remote meteor burst units is not valid.

7. The method of claim 1, further comprising using the first and second receiver processors to monitor the first and second receivers, respectively, to ensure correct operation of the first and second receivers.

8. The method of claim 1, further comprising simultaneously transmitting three or more data signals from three or more remote meteor burst units to the meteor burst base station, the meteor burst base station having three or more receivers that simultaneously receive and demodulate the three or more data signals to produce three or more demodulated data signals, the method further comprising simultaneously processing the content of the three or more demodulated data signals using three or more receiver processors dedicated to the three or more receivers, respectively, and formulating an acknowledgment signal after the demodulated data signals have been processed for simultaneous transmission to the three or more remote meteor burst units.

9. A meteor burst base station capable of simultaneous communication with multiple remote meteor burst units, each remote meteor burst unit including a transceiver that transmits a data signal, the base station comprising:

at least first and second receivers configured to receive and demodulate data signals, the first and second receivers being arranged to simultaneously receive first and second data signals transmitted from first and second remote meteor burst units, respectively, and demodulate the first and second data signals to produce first and second demodulated data signals;

at least first and second dedicated receiver processors arranged in communication with the first and second receivers, respectively, wherein the first and second receiver processors are configured to receive and simultaneously process the content of the first and second demodulated data signals from the first and second receivers;

a processing unit separate from the first and second receiver processors, in which the processing unit is arranged in communication with the first and second receiver processors for generating an acknowledgment signal after the first and second demodulated data signals have been processed; and a transmitter in communication with the processing unit for transmitting the acknowledgment signal simultaneously to the first and second remote meteor burst units.

10. The meteor burst base station of claim 9, wherein the processing unit is further configured to generate a probe signal that is transmitted by the transmitter to the first and second remote meteor burst units.

11. The meteor burst base station of claim 10, wherein if the first and second data signals are not received within a predetermined time period after transmission of the probe signal, the processing unit is configured to generate another probe signal.

12. The meteor burst base station of claim 9, wherein the first and second receiver processors are configured to validate the data received in the first and second demodulated data signals.

13. The meteor burst base station of claim 9, wherein the acknowledgment signal is a data packet that is addressed to at least the first and second remote meteor burst units.

14. The meteor burst base station of claim 9, wherein the acknowledgment signal includes a first data packet addressed to the first remote meteor burst unit and a second data packet addressed to the second remote meteor burst unit.

15. The meteor burst base station of claim 9, wherein the first and second receiver processors are further configured to monitor the first and second receivers, respectively, to ensure correct operation of the first and second receivers.

16. The meteor burst base station of claim 9, further comprising three or more receivers each having a dedicated receiver processor for simultaneous receipt, demodulation, and processing of three or more data signals transmitted from three or more remote meteor burst units, wherein the processing unit is arranged to generate and simultaneously transmit, via the transmitter, an acknowledgement signal to the three or more remote meteor burst units after the three or more data signals have been processed.

17. A meteor burst communication system comprising:
first and second remote meteor burst units, each of which include a transceiver that transmits a data signal; and
a meteor burst base station, including:
 (a) first and second receivers arranged to simultaneously receive first and second data signals from the first and second remote meteor burst units and demodulate the first and second data signals to produce first and second demodulated data signals;
 (b) first and second dedicated receiver processors in communication with the first and second receivers, respectively, for receiving and processing the content of the first and second demodulated data signals from the first and second receivers;
 (c) a processing unit separate from the first and second receiver processors, in which the processing unit is arranged in communication with the first and second receiver processors for generating an acknowledgment signal after the first and second demodulated data signals have been processed; and
 (d) a transmitter in communication with the processing unit for transmitting the acknowledgment signal simultaneously to the first and second remote meteor burst units.

18. The meteor burst communication system of claim 17, wherein the processing unit in the meteor burst base station is further configured to generate a probe signal that is transmitted by the transmitter to the first and second remote meteor burst units; and when the first and second remote meteor burst units receive the probe signal, the transceiver of the first and second remote meteor burst units respectively transmit the first and second data signals in response to receipt of the probe signal.

19. The meteor burst communication system of claim 18, wherein the processing unit is configured to determine whether the first and second data signals are received within a predetermined time period after the probe signal is transmitted.

20. The meteor burst communication system of claim 17, wherein the first and second receiver processors are configured to validate data received in the first and second demodulated data signals.

21. The meteor burst communication system of claim 17, wherein the processing unit is further configured to generate a summary message that summarizes data contained in the first and second demodulated data signals.

22. The meteor burst communication system of claim 21, wherein the processing unit is in data communication with a message center for sending the summary message to the message center.

23. The meteor burst communication system of claim 17, wherein the first and second receiver processors are further configured to monitor the first and second receivers, respectively, to ensure correct operation of the first and second receivers.

24. The meteor burst communication system of claim 17, further comprising three or more remote meteor burst units each having a transceiver that transmits a data signal, in which the meteor burst base station further comprises three or more receivers each having a dedicated receiver processor for simultaneous receipt, demodulation, and processing of data signals transmitted from the three or more remote meteor burst units, wherein the processing unit is arranged to generate and simultaneously transmit, via the transmitter, an acknowledgement signal to the three or more remote meteor burst units after the three or more data signals have been processed.

* * * * *